United States Patent
Boettcher et al.

(10) Patent No.: US 8,419,116 B2
(45) Date of Patent: Apr. 16, 2013

(54) VEHICLE FRAME ASSEMBLY

(75) Inventors: Eric Boettcher, Columbus, OH (US); Jamison Weirup, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 293 days.

(21) Appl. No.: 12/794,479

(22) Filed: Jul. 8, 2010

(65) Prior Publication Data
US 2012/0007373 A1 Jan. 12, 2012

(51) Int. Cl.
*B62D 25/08* (2006.01)

(52) U.S. Cl.
USPC . 296/203.02; 293/133; 293/155; 296/187.03; 296/187.09

(58) Field of Classification Search ............. 296/187.03, 296/187.09, 203.02, 187.04, 187.02, 193.01, 296/193.09, 203.03, 204; 293/117, 121, 293/131, 132, 133, 155; 180/68.4
See application file for complete search history.

(56) References Cited

U.S. PATENT DOCUMENTS

| | | | | |
|---|---|---|---|---|
| 3,834,686 | A * | 9/1974 | Moritz et al. | 267/116 |
| 5,201,566 | A * | 4/1993 | Mori | 296/192 |
| 5,611,568 | A * | 3/1997 | Masuda | 280/784 |
| 5,853,195 | A | 12/1998 | Le et al. | |
| 5,868,457 | A | 2/1999 | Kitagawa | |
| 6,499,798 | B2 | 12/2002 | Takemoto | |
| 6,588,830 | B1 | 7/2003 | Schmidt et al. | |
| 6,655,728 | B2 | 12/2003 | Sano et al. | |
| 6,702,347 | B1 | 3/2004 | Hollinger et al. | |
| 6,802,522 | B1 | 10/2004 | Park et al. | |
| 6,893,078 | B2 | 5/2005 | Saeki | |
| 6,896,281 | B2 | 5/2005 | Lenzen, Jr. et al. | |
| 6,938,948 | B1 * | 9/2005 | Cornell et al. | 296/187.09 |
| 6,957,846 | B2 | 10/2005 | Saeki | |
| 7,008,007 | B2 | 3/2006 | Makita et al. | |
| 7,284,788 | B1 * | 10/2007 | Barbat et al. | 296/187.09 |
| 7,300,080 | B2 | 11/2007 | Rebuffet et al. | |
| 7,407,192 | B2 | 8/2008 | Yoshimura | |
| 7,469,956 | B2 * | 12/2008 | Yasuhara et al. | 296/187.09 |
| 7,469,957 | B1 | 12/2008 | Boettcher | |
| 7,766,418 | B2 * | 8/2010 | Hemmersmeier | 296/193.1 |
| 7,810,878 | B2 * | 10/2010 | Nakamura et al. | 296/203.02 |
| 7,837,256 | B2 * | 11/2010 | Takayanagi et al. | 296/203.02 |
| 2002/0000738 | A1 | 1/2002 | Larsson et al. | |
| 2006/0113805 | A1 * | 6/2006 | Wakefield | 293/102 |

(Continued)

FOREIGN PATENT DOCUMENTS

DE 4401865 A1 * 8/1994

OTHER PUBLICATIONS

ATZ Autotechnology, "Frontal and Side Impact Compatibility Audi Q7 vs. Fiat 500 Crash Test", ATZ 0212009 vol. 111, p. 18-24.

*Primary Examiner* — Glenn Dayoan
*Assistant Examiner* — Pinel Romain
(74) *Attorney, Agent, or Firm* — Rankin, Hill & Clark LLP

(57) ABSTRACT

A frame assembly for a vehicle includes a front end frame assembly extending laterally across the vehicle and disposed adjacent a forward end of the vehicle, and a bumper beam extending laterally across the vehicle and spaced apart longitudinally forward of the front end frame assembly. A first set of spaced apart inner attachment structures connects the bumper beam to the front end frame assembly. A second set of spaced apart outer attachment structures also connects the bumper beam to the front end frame assembly. The second set of outer attachment structures is spaced apart from and flanks the first set of inner attachment structures.

21 Claims, 5 Drawing Sheets

U.S. PATENT DOCUMENTS

| | | | |
|---|---|---|---|
| 2007/0278825 A1* | 12/2007 | Braunbeck et al. | 296/187.09 |
| 2008/0191518 A1 | 8/2008 | Maruyama et al. | |
| 2008/0203766 A1* | 8/2008 | Hemmersmeier | 296/203.02 |
| 2008/0265623 A1 | 10/2008 | Kiyotake et al. | |
| 2009/0085373 A1* | 4/2009 | Terada et al. | 296/187.09 |
| 2009/0315343 A1* | 12/2009 | Gonin | 293/102 |
| 2010/0127531 A1* | 5/2010 | Yasuhara et al. | 296/187.09 |
| 2010/0127533 A1* | 5/2010 | Gonin | 296/193.09 |

\* cited by examiner

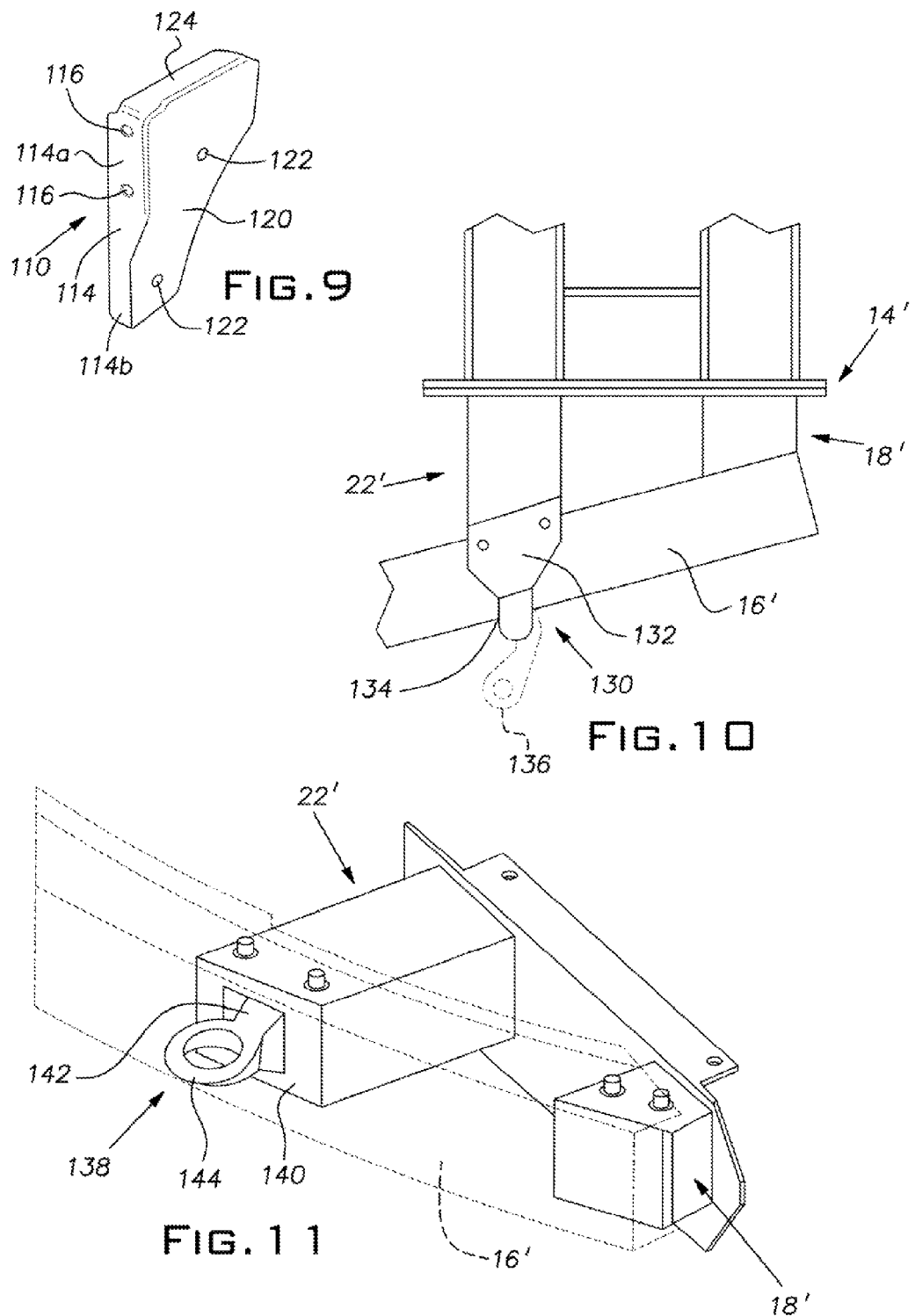

VEHICLE FRAME ASSEMBLY

BACKGROUND

Exemplary embodiments herein relate to vehicle frame assemblies, and more particularly relate to bumper beam assemblies and mounting arrangements for the bumper beam assemblies.

Vehicle frame assemblies often include a front end frame assembly extending laterally across a vehicle and disposed adjacent a forward end of the vehicle. The front end frame assembly can be a forward portion of the vehicle frame that defines a front wall of the vehicle's engine compartment. A bumper beam also extends laterally across the vehicle and is spaced apart longitudinally forward of the front and frame assembly. In a prior art construction, the bumper beam is attached to the front end frame assembly at opposite ends of the bumper beam by single attachment structures. More particularly, a first attachment structure is provided at one end of the bumper beam for attaching that end to the front end frame assembly and a second attachment structure is provided at a second, opposite end of the bumper assembly for attaching that end to the front end frame assembly. These attachment structures can be provided at or adjacent the respective ends of the bumper assembly, but are typically the only structures connecting the bumper beam to the front end frame assembly.

The attachment structures connecting the bumper beam to the front end frame assembly can each be in the form of a crush can for providing controlled deformation when the bumper beam is impacted by an external force (e.g., a front end collision). However, it can be difficult to design the crush can attachment structures to address both low speed and high speed crash conditions.

SUMMARY

According to one aspect, a frame assembly for a vehicle includes a front end frame assembly extending laterally across the vehicle and disposed adjacent a forward end of the vehicle, and a bumper beam extending laterally across the vehicle and spaced apart longitudinally forward of the front end frame assembly. A first set of spaced apart inner attachment structures connects the bumper beam to the front end frame assembly. A second set of spaced apart outer attachment structures also connects the bumper beam to the front end frame assembly. The second set of outer attachment structures is spaced apart from and flanks the first set of inner attachment structures.

According to another aspect, a bumper beam assembly for a vehicle includes a bumper beam extending laterally across the vehicle, at least one outer attachment structure and at least one inner attachment structure. The at least one outer attachment structure connects one end of the bumper beam to an associated frame structure of the vehicle. The at least one inner attachment structure further connects the same one end of the bumper beam to the associated frame structure. The at least one inner attachment structure is laterally spaced inward from the at least one outer attachment structure.

BRIEF DESCRIPTION OF THE DRAWINGS

FIG. 9 is a perspective view of an under-bumper bracket shown in isolation from the front end frame assembly of FIGS. 1-8.

FIG. 10 is a partial plan view of a bumper beam attached to a front end frame assembly with the bumper beam including a tow hook according to an alternate embodiment.

FIG. 11 is a partial perspective view of a bumper beam attached to a front end frame assembly with the bumper beam including a tow hook according to another alternate embodiment.

DETAILED DESCRIPTION

Figure 1:
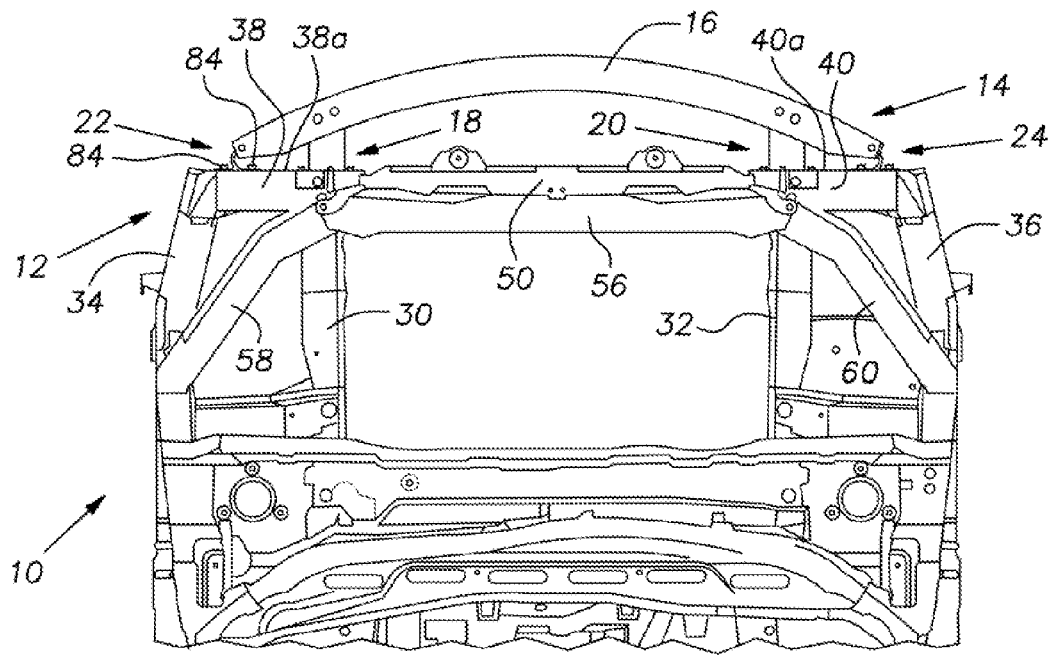
FIG. 1 is a top plan view of a front frame assembly for a vehicle having a bumper beam attached to a front end frame assembly.

Referring now to the drawings, wherein the showings are for purposes of illustrating one or more exemplary embodiments and not for purposes of limiting same, FIG. 1 illustrates a frame assembly for a vehicle, and particularly a front frame assembly 10 of the overall frame assembly. As is known and understood by those skilled in the art, the front frame assembly 10 can be secured to a floor frame assembly (not shown) disposed longitudinally rearwardly of the front frame assembly and a vehicle body (not shown) can be attached to the front frame assembly and the floor frame assembly. The front frame assembly 10 can include a front end frame assembly or sub-assembly 12 that extends laterally across the vehicle and is disposed at or adjacent a forward end of the vehicle. The front frame assembly 10 typically defines an engine compartment and the front end frame assembly 12 can be those components of the front frame assembly 10 that define a forward end of the engine compartment.

A bumper beam assembly 14 is disposed at a forward end of the front frame assembly 10. In particular, the bumper beam assembly 14 includes a bumper beam 16 extending laterally across the vehicle. The bumper beam 16 is spaced apart longitudinally forward of the front end frame assembly 12. As shown in FIGS. 3-8, at least one inner attachment structure (e.g., attachment structure 18) connects one end of the bumper beam 16 to the frame structure of the vehicle (i.e., the front end frame assembly 12) and at least one outer attachment structure (e.g., attachment structure 22) further connects the same one end of the bumper beam 16 to the frame structure. As will be described in more detail below, the at least one inner attachment structure is laterally spaced inward from the at least one outer attachment structure.

Figure 2:
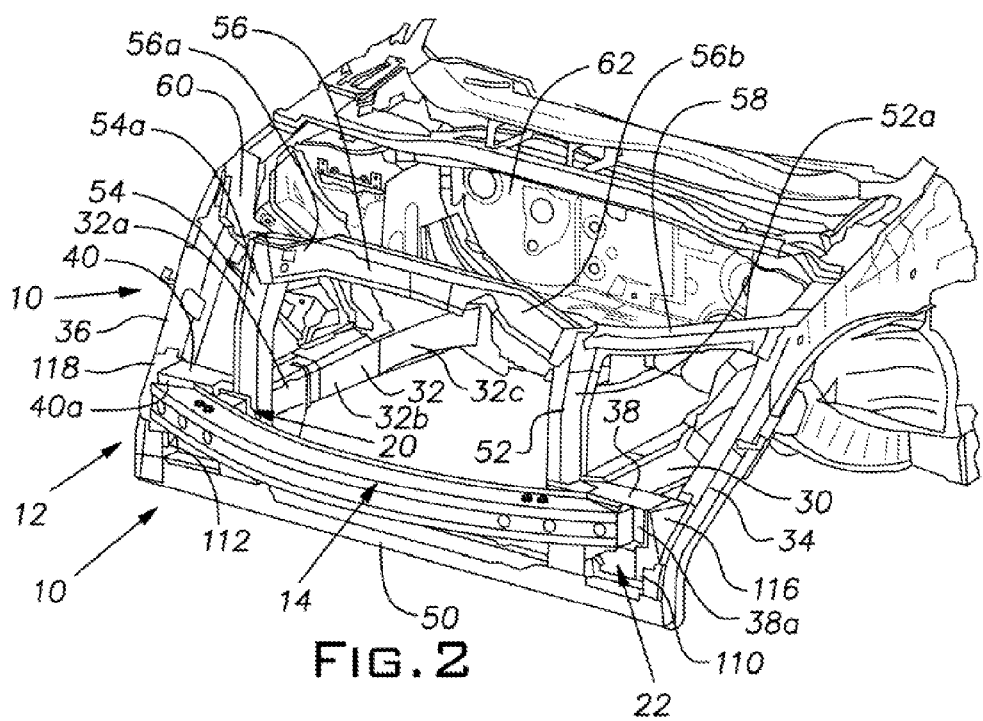
FIG. 2 is a front perspective view of the front frame assembly.

More particularly, as shown in FIGS. 1 and 2, in the illustrated embodiment a first set of spaced apart inner attachment structures 18, 20 connect the bumper beam 16 to the front end frame assembly 12. A second set of spaced apart attachment structures 22, 24 further connect the bumper beam 16 to the front end frame assembly 12. As shown, the second set of outer attachment structures 22, 24 are spaced apart from and flank the first set of inner attachment structures 18, 20. More specifically, one set of inner and outer attachment structures 18, 22 connects a first end of the bumper beam 16 to the front end frame assembly 12 and another set of inner and outer attachment structures 20, 24 connects a second, opposite end of the bumper beam 16 to the front end frame assembly 12.

Figure 7:
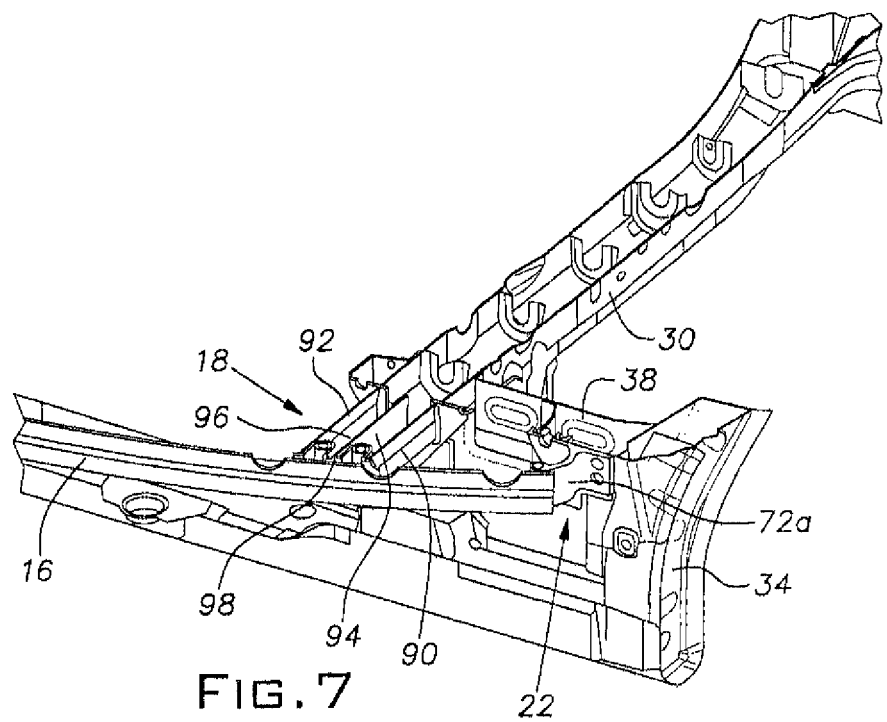
FIG. 7 is a partial perspective view, shown in cross section, of the bumper beam attached to the front end frame assembly.

The front frame assembly 10 further includes a pair of inner side members 30, 32 extending longitudinally rearwardly from the front end frame assembly 12. As shown, each of the pair of inner side members 30, 32 can be aligned with a corresponding one of the first set of spaced apart inner attachment structures 18,20. More specifically, the side member 30 is laterally aligned with the attachment structure 18 and the side member 32 is laterally aligned with the attachment structure 20. This can facilitate efficient transfer of load forces from the bumper beam 16 to the inner side members 30, 32 during a crash event. In addition, as shown in FIG. 7, the inner side members 30, 32 can include a plurality of spaced bulkheads 33 disposed along respective longitudinal lengths thereof.

The front frame assembly 10 can further include a pair of outer side members 34, 36 extending longitudinally rearwardly and angularly upwardly from the front end frame assembly 10. The outer side members 34, 36 flank the pair of inner side members 30, 32. The front frame assembly 10 of the illustrated embodiment, and particularly the front end frame assembly 12, can also include a pair of outrigger assemblies or members 38, 40 laterally connecting the pair of inner side members 30, 32 to the pair of outer side members 34, 36. Outrigger extension members 116, 118 can also be used to facilitate mounting of the outriggers members 38, 40 to their respective outer side members 34, 36. The outrigger members 38, 40, and the joints formed by the outrigger members 38, 40 with surrounding components, particularly to the outer side members 34, 36, can improve the sustainability of the front end frame assembly 12 and thus the front frame assembly 10 during front offset collisions. The bumper beam 16 in conjunction with the outrigger members 38, 40 can provide improved load distribution across the front of the frame assembly 10.

As shown, the first set of inner attachment structures 20, 22 each have a forward end secured to the bumper beam 16 and a rear end secured to a respective one of the pair of outrigger members 38, 40. Likewise, the second set of outer attachment structures 34, 36 each have a forward end secured to the bumper beam 16 and a rear end secured to a respective one of the pair of outrigger members 38, 40. As specifically shown in FIGS. 3-8 with respect to the outrigger member 38, each of the outrigger members 38, 40 has a forward substantially vertically oriented wall 38a, 40a to which adjacent ones of the inner and outer attachment structures 18-24 are mounted (e.g., attachment structures 18 and 22 are mounted to the outrigger member 38 and the attachment structures 20, 24 are mounted to the forward wall 40A of the out rigger member 40). Advantageously, each of the pair of outrigger members 38, 40 overlaps joints formed between adjacent ones of the inner and outer attachment structures 30-36 and the front end frame assembly 12.

The front end frame assembly 12 can further include a lower bulkhead 50 extending laterally across the vehicle and a pair of support members 52, 54 extending substantially vertically upwardly from the lower bulkhead 50. As shown, each of the first set of inner attachment structures 18, 20 can be laterally aligned with a corresponding one of the pair of support members 52, 54. In particular, attachment structure 18 can be aligned with the support member 52 and the attachment structure 20 can be aligned with the support member 54. The front end frame assembly 12 can further include an upper bulkhead 56 extending laterally between upper ends 52a, 54a of the pair of support members 52, 54. Additionally, a pair of reinforcing members 58, 60 can connect the upper ends 52a, 54a of the pair of support members 52, 54 and opposite ends 56a, 56b of the upper bulkhead 56 to the pair of outer side members 34, 36.

Each of the inner side members 30, 32 can have a substantially straight line construction with thicknesses and/or lateral cross-sectional areas (i.e., cross-sectional areas taken laterally across the side members 30, 32) that progressively increase as the respective inner side members 30, 32 extend longitudinally rearwardly from the front and frame assembly 12. This construction allows the inner side members 30, 32 to deform longitudinally during a crash event. This allows for increased energy absorption while minimizing intrusion of the side frame members into the vehicle cabin (i.e., beyond illustrated firewall 62) during a vehicle crash condition. In the illustrated embodiment, the side members 30, 32 include both progressive increases in thicknesses and lateral cross-sectional areas. The progressive increases in thickness and lateral cross-sectional area can occur through the use of longitudinal sections, which themselves have progressively increased thicknesses and lateral cross-sectional areas relative to one another as the inner side members 30, 32 extend longitudinally rearwardly from the front end frame assembly 12.

Figure 6:
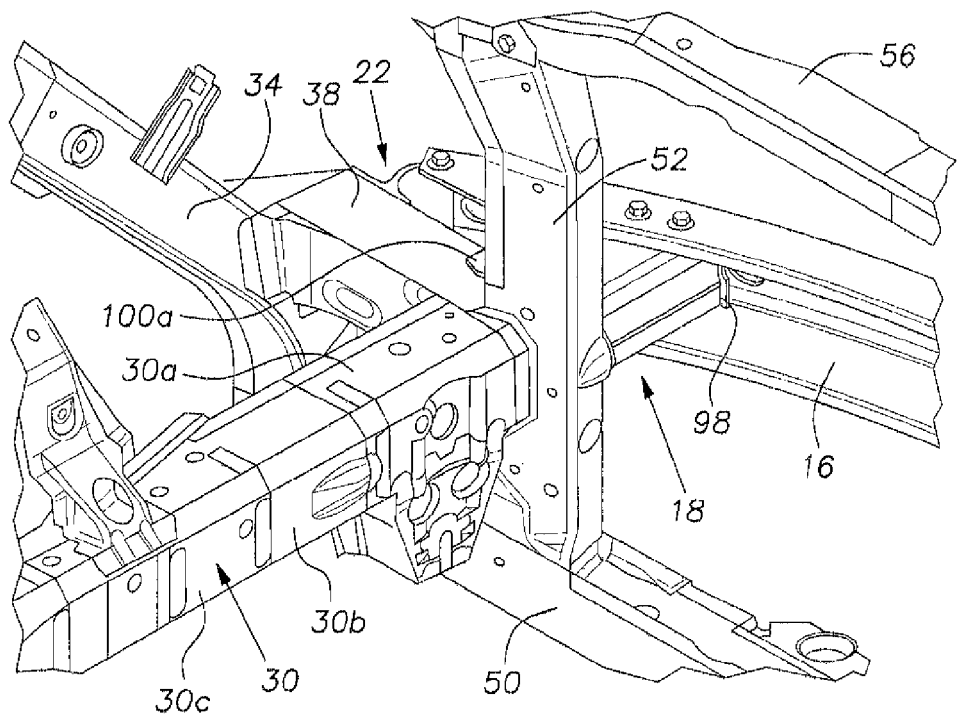
FIG. 6 is an inside perspective view of the bumper beam attached to the front end frame assembly.

As best shown in FIG. 6 with respect to the inner side member 32, for example, the inner side members 30, 32 can be formed of a first section (e.g., first section 32a), a second section (e.g., 32b), and a third section (e.g., third section 32c). The second section can have an increased thickness relative to the first section and the third section can have an increased thickness relative to the second section. In addition, the second section can have a lateral cross-sectional area that is greater than that of the first section and the third section can have a lateral cross-sectional area that is greater than that of the second section. Also, a shape of the lateral cross-sections of each of the inner side members 30, 32 can be heptagonal or octagonal to maintain the advantageous straight line deformation mentioned hereinabove. In the illustrated embodiment, the inner side members 30, 32 employ a heptagonal cross section. In one embodiment, the first and second sections of the side members 30, 32 can be tuned to provide axial crush, whereas the third sections can be tuned to have a bending crush.

As already mentioned, the frame assembly of the illustrated embodiment advantageously employs a double attachment at each end of the bumper beam 16 whereby the bumper beam 16 is attached to the front end frame assembly 12. The double attachment is provided by the first and second attachment structures 18-24 in the illustrated embodiment. That is, adjacent inner and outer attachment structures 18, 22 connect one end of the bumper beam 16 to the front end frame assembly 12 and adjacent attachment structures 20, 24 connect a second, opposite end of the bumper beam 16 to the front end frame assembly 12. Each set of inner and outer attachment structures 20-24 are arranged such that the attachment structures can work together to meet low speed and high speed energy absorption targets within a given stroke while also minimizing overall weight of the vehicle's frame assembly. This is achieved in part due to increased static stiffness of the bumper beam assembly 14, which is provided (at least in part) by the employment of double attachment structures at each end of the bumper beam 16.

Having the outer attachment structures 22, 24 in addition to the inner attachment structures 18, 20 for connecting the bumper beam 16 to the front end frame assembly 12 enables the bumper beam 16 to be capable of handling greater bending moment loading. More specifically, ends of the bumper beam 16 are less susceptible to simply pivoting about a single crush can type attachment at each end of the bumper beam due to the provision of the secondary outer attachment structures 22, 24. This allows the bumper beam 16 to be constructed with a reduced weight, while still providing superior low speed crash performance as well as more stable mid-speed crush of the primary or inner attachment structures 18, 20.

Figure 3:
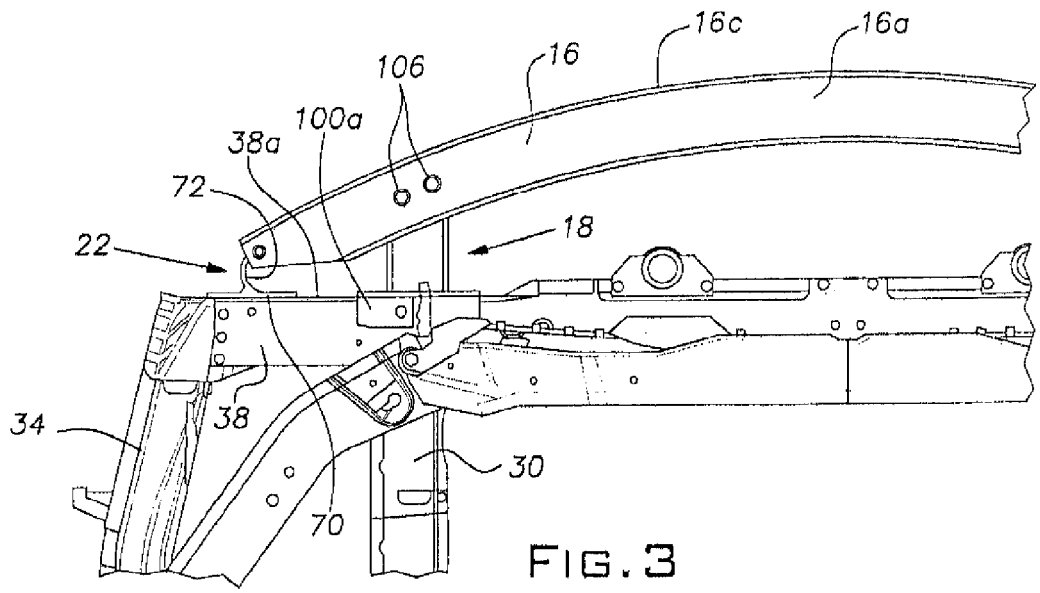
FIG. 3 is a partial top plan view of one end of the bumper beam attached to the front end frame assembly by inner and outer attachment structures.
Figure 4:
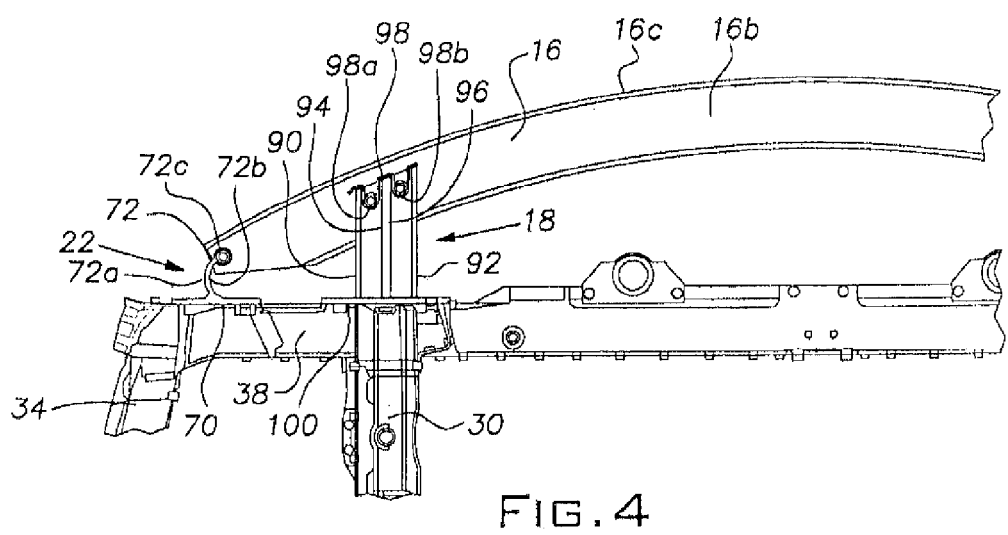
FIG. 4 is a partial section view of the bumper beam attached to the front end frame assembly.
Figure 5:
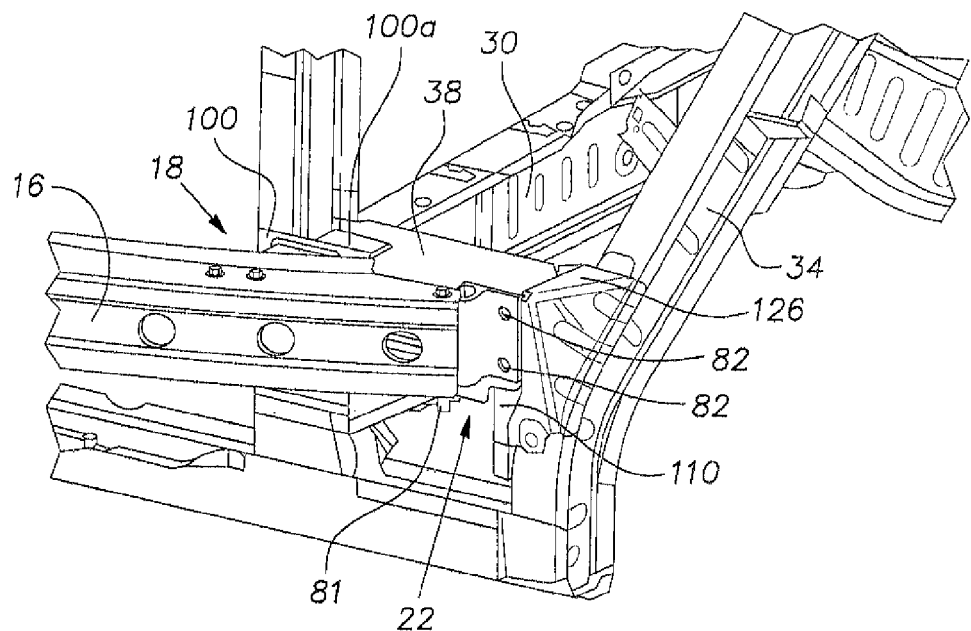
FIG. 5 is a partial perspective view of the bumper beam attached to the front end frame assembly.
Figure 8:
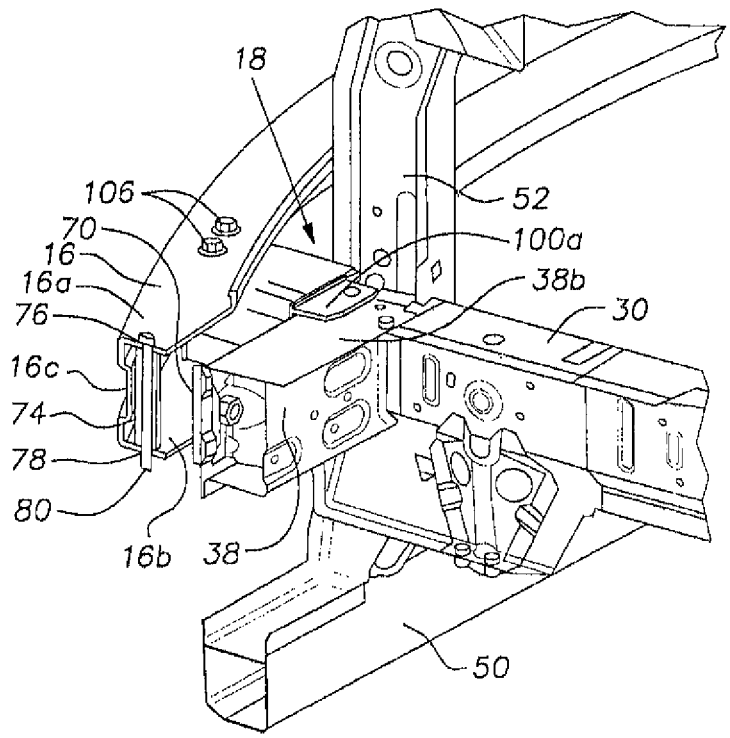
FIG. 8 is a partial side perspective view of the bumper beam attached to the front end frame assembly.

To facilitate such improvements, in the illustrated embodiment, each of the pair of outer attachment structures 22, 24 includes a base plate and a curved portion. As the attachment structures 22, 24 are mirrored relative to one another, only the attachment structure 22 will be described in further detail herein, but all details discussed in reference to the attachment structure 22 are applicable to the attachment structure 24. Referring specifically to FIGS. 3, 4 and 8, the attachment structure 22 includes base plate 70, which is oriented in a vertical plane for mounting to the front end frame assembly 12, and curved portion 72 extending longitudinally forwardly from the base plate 70 for mounting to the bumper beam 16. In the illustrated embodiment, the curved portion 72 has a convex side 72a directed laterally outwardly and a concave side 72b directed laterally inwardly.

A distal end 72c of the curved portion 72 defines a vertically extending throughole 74 that is in registry with apertures 76, 78 defined in upper and lower walls 16a, 16b of the bumper beam 16 for receipt of an elongated fastener 80 for securing the bumper beam 16 to the outer attachment structure 22. By way of example, the fastener 80 can be an elongated bolt that is received through the apertures 76, 78 and the throughole 74 and has a threaded member, such as a nut 81 (FIG. 5), secured on a distal end thereof. The base plate 70 can have a plurality of apertures 82 defined therein for receipt of fasteners 84 (FIG. 1) that secure the outer attachment structure 22 to the adjacent outrigger member 38. By this arrangement, the outer attachment structure 22, 24 connect opposite ends of the bumper beam 16 to the front end frame assembly 12.

Each of the first set of spaced apart inner attachment structures 18, 20 can have a crush can construction. Like the outer attachment structures 22, 24, the inner attachment structures 18, 20 can be mirror images of one another and thus only the outer attachment structure 22 will be described in further detail herein but all details relating to the outer attachment structure 22 can be applied to the outer attachment structure 24. With particular reference to FIG. 4, the inner attachment structure 18 can include at least two substantially vertical walls extending from the bumper beam 16 to the front end frame assembly 12. In the illustrated embodiment, the at least two substantially vertical walls include two spaced apart outer walls 90, 92 and two closely spaced inner walls 94, 96.

A first end wall 98 can be disposed at a forward end of the walls 90-96 and a second end wall 100 can be disposed at a rearward end of the walls 90-96. The forward end wall 98 is received inside the bumper beam 16 adjacent an interior surface of vertical wall 16c of the bumper beam 16. That is, the first end wall 98 is received within a recess defined by the C-shaped walls 16a, 16b, 16c of the bumper beam 16. In the illustrated embodiment, the first end wall 98 includes a first longitudinally protruding portion 98a received between one of the outer walls (i.e., outer wall 90) and an adjacent one of the inner walls (i.e., inner walls 94) and a second longitudinally protruding portion 98b received between the other of the outer walls (i.e., outer wall 92) and the other of the inner walls (i.e., inner wall 94). As shown, the protruding portions 98a, 98b can include vertically extending throughholes that are in registry with apertures defined in the upper and lower walls 16a, 16b of the bumper beam 16 for receipt of respective elongated fasteners 106 for securing the bumper beam 16 to the inner attachment structure 18. The first end wall 98 can function to prevent the trim edges of the inner attachment structure 18 from more easily shearing through the bumper beam 16. The second end wall 100 can include a flange 100a for overlapping onto the adjacent outrigger member 38, in particularly an upper wall 38b thereof.

As will be appreciated by those skilled in the art, the inner attachment structures 18, 20 have a more substantial construction than the outer attachment structures 22, 24. In this regard, the inner attachment structures 18, 20 of the illustrated embodiment serve as primary attachment structures for the bumper beam 16 and the outer attachment structures 22, 24 serve as secondary attachment structures for the bumper beam 16. In a crash condition, the outer attachment structures 22, 24 of the illustrated embodiment are likely to encounter mostly tensile loading in low speed events, with some loading compliance helping to balance the dynamic response of the bumper beam 16 and the inner attachment structures 18, 20. In mid-speed and higher energy level frontal crash events, the outer attachment structures 22, 24 can have their loading change from tensile to compressive loading. This compressive loading, at sufficient energy levels, can allow both the inner and outer attachment structures 18, 24 to absorb kinetic energy during the crash event.

With reference to FIG. 2, the front end frame assembly can additionally include a pair of under-ride or under-bumper compatibility brackets 110, 112 to which the pair of outer attachment structures 22, 24 is attached. The brackets 110, 112 can be mirror images of one another and thus only the bracket 110 will be described with further detail herein but all details discussed herein relating to the bracket 110 can be applied to the bracket 112. With additional reference to FIGS. 5 and 9, the bracket 110 has a forward wall 114 including an upper mounting portion 114a through which apertures 116 are defined and a lower extension portion 114b depending from the mounting portion 114a for receiving impact loads received under the bumper beam 16 (i.e., under-bumper loads). The mounting portion 114a has the corresponding outer attachment structure 22 mounted thereto. As shown with respect to the bracket 110, each under-bumper bracket 110, 112 directly connects to an adjacent outrigger member 34 or 36 and to an adjacent outer side member 116 or 118 (i.e., the bracket 110 is directly connected to the adjacent outrigger member 38 and to the adjacent outer side member 34). The brackets 110, 112 are provided to distribute loads from a smaller vehicle that might under-ride the bumper beam 16 thereby maintaining sufficient structural overlap and distributing impact load into the overall front end assembly 12.

In addition, the bracket 110 connects the adjacent outrigger member 38 to an extension member 116 which facilitates connection between the outrigger member 38 and the outer side member 34. The bracket 112 similarly connects the adjacent outrigger member 40 to an extension member 118 which facilitates connection between the outrigger member 40 and the outer side member 36. Fasteners, such as elongated bolts 84 (FIG. 1) can be received through the apertures 82 in the outer attachment structure 22 and through the apertures 116 in the bracket 110 when in registry with one another for securing the outer attachment member 22 to the bracket 110. These same fasteners can further connect the outer attachment structure 22 to the outrigger member 38 and the outrigger extension member 116.

The bracket 110 can additionally include a side wall 120 which is oriented approximately orthogonally to the front wall 114 in the illustrated embodiment. The side wall 120 can be connected to the outer side member 34. For example, the side wall 120 can be spot welded to the outer side member 34 and apertures 122 can be used as datum holes for aligning the bracket and the outer side member 34 before welding, though this is not required. Alternatively, the side wall 120 can be connected to the outer side member using other known connecting means, such as suitable fasteners for example. The bracket 110 can further include an upper wall 124 orthogonally oriented relative to the front wall 114 and the side wall 120 in the illustrated embodiment. The top wall 124 can overlap or be overlapped by the top wall of the outrigger member 38 and/or a top wall 126 of the extension member 116.

With reference to FIG. 10, a bumper beam assembly 14' is schematically illustrated with a tow hook assembly 130 according to an alternate embodiment. Though not shown, the tow hook assembly 130 could be employed in the bumper beam assembly 14 of the illustrated embodiment of FIGS. 1-9, though this is not required. In FIG. 10, like reference numbers are used for like components and like reference numbers with a prime symbol are used for similar components (i.e., components of FIG. 10 that are like or similar to components illustrated in FIGS. 1-9). As shown in FIG. 10, at least one two hooks 130 can be disposed on bumper beam 16' at a location laterally aligned with at least one inner attachment member 22'. In one example, a tow hook assembly 130 could be provided with each inner attachment structure, though the bumper beam 16' could be secured by inner attachment structures and outer attachment structures if described herein with reference to the bumper beam 16. The tow hook assembly 130 can include a mounting plate 132 and a hook member 134 attached to a forward end of the mounting plate 132. The hook member 134 can include a substantially vertically extending bar (not shown) to which an associated towing mechanism 136 can be secured.

FIG. 11 shows an alternate construction for the tow hook according to another alternate embodiment. The tow hook assembly 138 of FIG. 11 can include a base plate 140 received inside the bumper beam 16' adjacent an interior surface of a forward or vertical wall 16c' of the bumper beam 16. The tow hook assembly 138 can also include a stem 142 extending from the base plate 140 through an aperture (not shown) defined in the vertical wall 16c of the bumper beam 16' with a hooked or looped portion 144 disposed distally on the stem 142 adjacent an outside surface of the vertical wall 16c of the bumper beam 16'. Both tow hook assemblies 130, 138 can be permanently installed on the vehicle frame thereby providing customers immediate access when towing is necessary.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A frame assembly for a vehicle, comprising:
a front end frame assembly extending laterally across the vehicle and disposed adjacent a forward end of the vehicle;
a bumper beam extending laterally across the vehicle and spaced apart longitudinally forward of the front end frame assembly;
a first set of spaced apart inner attachment structures connecting the bumper beam to the front end frame assembly; and
a second set of spaced apart outer attachment structures connecting the bumper beam to the front end frame assembly, the second set of outer attachment structures spaced apart from and flanking the first set of inner attachment structures, wherein the pair of outer attachment structures connect opposite ends of the bumper beam to the front end frame assembly.

2. The frame assembly of claim 1 further including:
a pair of inner side members extending longitudinally rearwardly from the front end frame assembly, each of the pair of inner side members laterally aligned with a corresponding one of the first set of spaced apart inner attachment structures and having a longitudinal extent generally collinear with a longitudinal extent of the corresponding one of the first set of spaced apart inner attachment structures.

3. The frame assembly of claim 2 further including:
a pair of outer side members extending longitudinally rearwardly from the front end frame assembly and flanking the pair of inner side members, and
a pair of outrigger members laterally connecting the pair of inner side members to the pair of outer side members, the first set of inner attachment structures each having a forward end secured to the bumper beam and a rear end secured to a respective one of the pair of outrigger members, and the second set of outer attachment structures each having a forward end secured to the bumper beam and a rear end secured to a respective one of the pair of outrigger members.

4. The frame assembly of claim 3 wherein each of said pair of outrigger members has a forward substantially vertically oriented wall to which adjacent ones of the inner and outer attachment structures are mounted.

5. The frame assembly of claim 3 wherein each of the pair of outrigger members overlaps joints between adjacent ones of the inner and outer attachment structures and the front end frame assembly.

6. A frame assembly for a vehicle, comprising:
a front end frame assembly extending laterally across the vehicle and disposed adjacent a forward end of the vehicle;
a bumper beam extending laterally across the vehicle and spaced apart longitudinally forward of the front end frame assembly;
a first set of spaced apart inner attachment structures connecting the bumper beam to the front end body assembly;
a second set of spaced apart outer attachment structures connecting the bumper beam to the front end body assembly, the second set of outer attachment structures spaced apart from and flanking the first set of inner attachment structures; and
a pair of under-bumper brackets having respective mounting portions to which the outer attachment structures are connected and respective extension portions depending from the mounting portions for receiving under-bumper loads, each under-bumper bracket directly connected to an adjacent outrigger member and to an adjacent outer side member.

7. The frame assembly of claim 2 wherein the front end frame assembly includes:
a lower bulkhead extending laterally across the vehicle; and
a pair of support members extending substantially vertically upwardly from the lower bulkhead, each of the first set of inner attachment structures laterally aligned with a corresponding one of the pair of support members.

8. The frame assembly of claim 7 wherein the front end frame assembly further includes:
an upper bulkhead extending laterally between upper ends of the pair of support members; and
a pair of reinforcing members connecting the upper ends of the pair of support members and opposite ends of the upper bulkhead to the pair of outer side members.

9. The frame assembly of claim 2 wherein each of the inner side members has a substantially straight line construction with thicknesses that progressively increase as the inner side members extend longitudinally rearwardly from the front end frame assembly.

10. A frame assembly for a vehicle, comprising:
a front end frame assembly extending laterally across the vehicle and disposed adjacent a forward end of the vehicle;
a bumper beam extending laterally across the vehicle and spaced apart longitudinally forward of the front end frame assembly;
a first set of spaced apart inner attachment structures connecting the bumper beam to the front end body assembly;
a second set of spaced apart outer attachment structures connecting the bumper beam to the front end body assembly, the second set of outer attachment structures spaced apart from and flanking the first set of inner attachment structures, wherein each of the pair of outer attachment structures includes:
a base plate oriented in a vertical plane for mounting to the front end frame assembly; and
a curved portion extending longitudinally forwardly from the base plate for mounting to the bumper beam.

11. The frame assembly of claim 10 wherein the curved portion has a convex side directed laterally outwardly and a concave side directed laterally inwardly.

12. The frame assembly of claim 10 wherein a distal end of the curved portion defines a vertically extending throughole that is in registry with apertures defined in upper and lower walls of the bumper beam for receipt of an elongated fastener for securing the bumper beam to the outer attachment structure.

13. A frame assembly for a vehicle, comprising:
a front end frame assembly extending laterally across the vehicle and disposed adjacent a forward end of the vehicle;
a bumper beam extending laterally across the vehicle and spaced apart longitudinally forward of the front end frame assembly;
a first set of spaced apart inner attachment structures connecting the bumper beam to the front end body assembly;
a second set of spaced apart outer attachment structures connecting the bumper beam to the front end body assembly, the second set of outer attachment structures spaced apart from and flanking the first set of inner attachment structures, wherein each of the first set of spaced apart inner attachment structures has a crush can construction, including:
at least two substantially vertical walls extending from the bumper beam to the front end frame assembly;
a first end wall disposed at a forward end of the at least two substantially vertical walls; and
a second end wall disposed at a rearward end of the at least two substantially vertical walls.

14. The frame assembly of claim 13 wherein the at least two substantially vertical walls includes:
two spaced apart outer walls; and
two closely spaced inner walls.

15. The frame assembly of claim 14 wherein the first end wall includes a first longitudinally protruding portion received between one of the outer walls and an adjacent one of the inner walls and a second longitudinally protruding portion received between the other of the outer walls and the other of the inner walls, the protruding portions including vertically extending throughholes that are in registry with apertures defined in upper and lower walls of the bumper beam for receipt of respective elongated fasteners for securing the bumper beam to the inner attachment structure.

16. The frame assembly of claim 1 wherein the front end frame assembly includes a pair of under-ride brackets to which the pair of outer attachment structures is attached, each of the under-ride brackets has a mounting portion to which a corresponding one of the outer attachment structures is mounted and an extension portion extending downward from the mounting portion for receiving impact loads received under the bumper beam.

17. The frame assembly of claim 1 further including:
at least one tow hook disposed on the bumper beam at a location laterally aligned with at least one of the inner attachment members.

18. The frame assembly of claim 17 wherein the at least one tow hook includes:
a base plate received inside the bumper beam adjacent an interior surface of a vertical wall of the bumper beam;
a stem extending from the base plate through an aperture defined in the vertical wall of the bumper beam; and
a hooked or looped portion disposed distally on the stem adjacent an outside surface of the vertical wall of the bumper beam.

19. The frame assembly of claim 1 wherein each of the outer attachment structures has a base plate secured to the front end frame assembly and a curved portion extending between the base plate and the bumper beam, and wherein each of the inner attachment structures has a crush can construction.

20. A frame assembly for a vehicle, comprising:
a front end frame assembly extending laterally across the vehicle and disposed adjacent a forward end of the vehicle;
a bumper beam extending laterally across the vehicle;
a first set of attachment structures connecting ends of the bumper beam to the front end frame assembly;
a second set of attachment structures connecting the bumper beam to the front end frame assembly, the second set of attachment structures connecting to the front end frame assembly at laterally spaced apart locations relative to where the first set of attachment structures connect to the front end frame assembly;
wherein the front end frame assembly includes a lower bulkhead extending laterally across the vehicle; and
a pair of support members extending substantially vertically upwardly from the lower bulkhead, each of the first set of inner attachment structures laterally aligned with a corresponding one of the pair of support members.

21. The frame assembly of claim 20 wherein the front end frame assembly further includes:
an upper bulkhead extending laterally between upper ends of the pair of support members; and
a pair of reinforcing members connecting the upper ends of the pair of support members and opposite ends of the upper bulkhead to the pair of outer side members.

* * * * *